(12) United States Patent
Gopalakrishnan et al.

(10) Patent No.: US 10,255,554 B2
(45) Date of Patent: Apr. 9, 2019

(54) ANOMALY DETECTION APPARATUS, METHOD, AND COMPUTER PROGRAM USING A PROBABILISTIC LATENT SEMANTIC ANALYSIS

(71) Applicant: Futurewei Technologies, Inc., Plano, TX (US)

(72) Inventors: Nandu Gopalakrishnan, Chatham, NJ (US); Yirui Hu, Piscataway, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 799 days.

(21) Appl. No.: 14/811,750

(22) Filed: Jul. 28, 2015

(65) Prior Publication Data
US 2017/0032266 A1 Feb. 2, 2017

(51) Int. Cl.
*G06N 99/00* (2010.01)
*G06N 7/00* (2006.01)
*G06N 5/02* (2006.01)

(52) U.S. Cl.
CPC .............. *G06N 7/005* (2013.01); *G06N 5/02* (2013.01); *G06N 99/005* (2013.01)

(58) Field of Classification Search
CPC .................................................. G06N 99/005
See application file for complete search history.

(56) References Cited

U.S. PATENT DOCUMENTS

| 8,744,124 | B2 | 6/2014 | Venkatesh et al. |
| 8,983,475 | B2 | 3/2015 | Gopalakrishnan |
| 2003/0084321 | A1* | 5/2003 | Tarquini .............. H04L 63/1458 726/23 |
| 2011/0052000 | A1 | 3/2011 | Cobb et al. |
| 2012/0063641 | A1 | 3/2012 | Venkatesh et al. |

FOREIGN PATENT DOCUMENTS

| CN | 101452478 A | 6/2009 |
| CN | 102449660 A | 5/2012 |

OTHER PUBLICATIONS

J. Li, S. Gong, and T. Xiang, "Global Behaviour Inference using Probabilistic Latent Semantic Analysis", BMVC, vol. 3231, 2008, 10 pages. (Year: 2008).*
B. Sun, et al. "Mobility-based anomaly detection in cellular mobile networks", Proc. 3rd ACM Workshop on Wireless Sec., ACM, 2004, pp. 61-69. (Year: 2004).*
I. Gbashi et al., "Proposed vision for Network Intrusion Detection System Using Latent Semantic Analysis and Data Mining", 6th Comp. Sci. and Electr. Eng. Conf., 2014, IEEE, pp. 11-16. (Year: 2014).*
U.S. Appl. No. 14/811,750, filed Jul. 28, 2015.
(Continued)

*Primary Examiner* — Vincent Gonzales
(74) *Attorney, Agent, or Firm* — Slater Matsil, LLP

(57) ABSTRACT

An anomaly detection apparatus, method, and computer program product are provided using a probabilistic latent semantic analysis (PLSA). In use, data is received, and a PLSA is performed, based on the data. Further, one or more anomalies are detected in the data, based on the PLSA. Still yet, information identifying the one or more anomalies is stored and/or displayed.

20 Claims, 15 Drawing Sheets

(56) References Cited

OTHER PUBLICATIONS

International Search Report and Written Opinion from International Application No. PCT/CN2015/091009, dated Mar. 24, 2016.
Wikipedia, "Mixture Model," Jul. 8, 2015, pp. 1-11, retrieved from https://en.wikipedia.org/wiki/Mixture_model.
Wikipedia, "Hidden Markov Model," Jul. 6, 2015, pp. 1-17, retrieved from https://en.wikipedia.org/wiki/Hidden_Markov_model.
"Probabilistic latent semantic analysis," retrieved from http://encyclopedia.thefreedictionary.com/Probabilistic+Latent+Semantic+Analysis.
Hofmann, T., "Collaborative Filtering via Gaussian Probabilistic Latent Semantic Analysis," SIGIR'03, Jul. 28-Aug. 1, 2003, pp. 1-8.

\* cited by examiner

| TIME | PERCENTAGE |
|---|---|
| 00:30-02:00 | 99% |
| 02:30-03:30 | 99% |
| 04:00-05:30 | 99% |
| 06:00-07:30 | 99% |
| 08:00-10:00 | 99% |
| 11:00-17:30 | 99% |
| 18:00-22:00 | 99% |
| 23:00-00:00 | 99% |

| TIME | PERCENTAGE |
|---|---|
| 00:30-02:00 | 99% |
| 02:30-03:30 | 99% |
| 04:00-05:30 | 99% |
| 06:00-07:30 | 99% |
| 08:00-10:00 | 99% |
| 11:00-17:30 | 99% |
| 18:00-22:00 | 99% |
| 23:00-00:00 | 99% |

| TIME | PERCENTAGE |
|---|---|
| 00:30-02:00 | 99% |
| 02:30-03:30 | 99% |
| 04:00-05:30 | 99% |
| 06:00-07:30 | 99% |
| 08:00-10:00 | 99% |
| 11:00-17:30 | 99% |
| 18:00-22:00 | 99% |
| 23:00-00:00 | 99% |

| TIME | PERCENTAGE |
|---|---|
| 00:30-02:00 | 99% |
| 02:30-03:30 | 99% |
| 04:00-05:30 | 99% |
| 06:00-07:30 | 99% |
| 08:00-10:00 | 99% |
| 11:00-17:30 | 99% |
| 18:00-22:00 | 99% |
| 23:00-00:00 | 99% |

| TIME | PERCENTAGE |
|---|---|
| 00:30-02:00 | 99% |
| 02:30-03:30 | 99% |
| 04:00-05:30 | 99% |
| 06:00-07:30 | 99% |
| 08:00-10:00 | 99% |
| 11:00-17:30 | 99% |
| 18:00-22:00 | 99% |
| 23:00-00:00 | 99% | ns
ANOMALY DETECTION APPARATUS, METHOD, AND COMPUTER PROGRAM USING A PROBABILISTIC LATENT SEMANTIC ANALYSIS

FIELD OF THE INVENTION

The present invention relates to data processing systems, and more particularly to analyzing data for anomaly detection.

BACKGROUND

There are a variety of techniques for anomaly (e.g. outlier, etc.) detection in cellular network nodes at the radio network controller- (RNC-) or cell-level. Anomalies are typically designated as data that is abnormal or does not fit a usual distribution. Unfortunately, when the aforementioned usual distribution varies with time, space, or entities responsible for generating partitions of the data, it can pose a challenge for effective anomaly detection.

There is thus a need for addressing these and/or other issues associated with the prior art.

SUMMARY

An anomaly detection apparatus is provided with at least one processor configured for performing a probabilistic latent semantic analysis (PLSA). Such apparatus is equipped for receiving data and performing a PLSA, based on the data. Further, the apparatus detects one or more anomalies in the data, based on the PLSA. Still yet, information identifying the one or more anomalies is stored and/or displayed by the apparatus.

An anomaly detection method is also provided using a PLSA. In use, data is received, and a PLSA is performed, based on the data. Further, one or more anomalies are detected in the data, based on the PLSA. Still yet, information identifying the one or more anomalies is stored and/or displayed.

Even still, an anomaly detection computer program product is provided for using a PLSA. The computer program product is configured such that data is received, and a PLSA is performed, based on the data. Further, one or more anomalies are detected in the data, based on the PLSA. Still yet, information identifying the one or more anomalies is stored and/or displayed.

DETAILED DESCRIPTION

Anomaly detection in wireless networks (and other environments) is an important challenge for tasks such as fault diagnosis, intrusion detection, monitoring applications, and/or other tasks where anomaly detection is useful. An example of an anomaly within a wireless data network includes the transmission of data that has an abnormal pattern and does not conform to an expected data distribution. However, when the expected distribution varies with time, it can pose a challenge for effective anomaly detection, as the expected pattern at a first time may vary significantly from that at a second time.

It is possible to develop a model that looks at the entire data collected over all time slots/periods without explicit regard to a time variable. However, generating such a model may lead to inaccuracy as the time, or other circumstances such as neighbor status, may skew results of a model, leading either to a missed detection or an inaccurate result.

It is also possible to develop a specific model for various time slots, however, this approach suffers from the fact that parameters of the distribution learned from the segmentation of data is of poor quality, since there is much less data per segment to train with, and it is much less efficient as it does not consider that several slots may have the same behavior/model and may be pooled together. Furthermore, this approach does not consider the time-correlation between adjacent time series points.

One method of addressing the general problem involving a model that uses all data, and/or a specific model using various time slots, is to use a probabilistic latent semantic analysis (PLSA) to create a model that can bridge the general and specific model for a wireless network. Another method disclosed herein involves use of a Bayesian framework upon existing Gaussian Mixture Model (GMM) which identifies hidden semantic associations for co-occurrence data and adopts it for anomaly detection within a wireless network. The adoption of a dependent Bayesian model for co-occurrence data with a latent variable that uncovers hidden structure/relationships in the data (in particular, time or space dependency) will show improved accuracy in anomaly detection.

Figure 1:
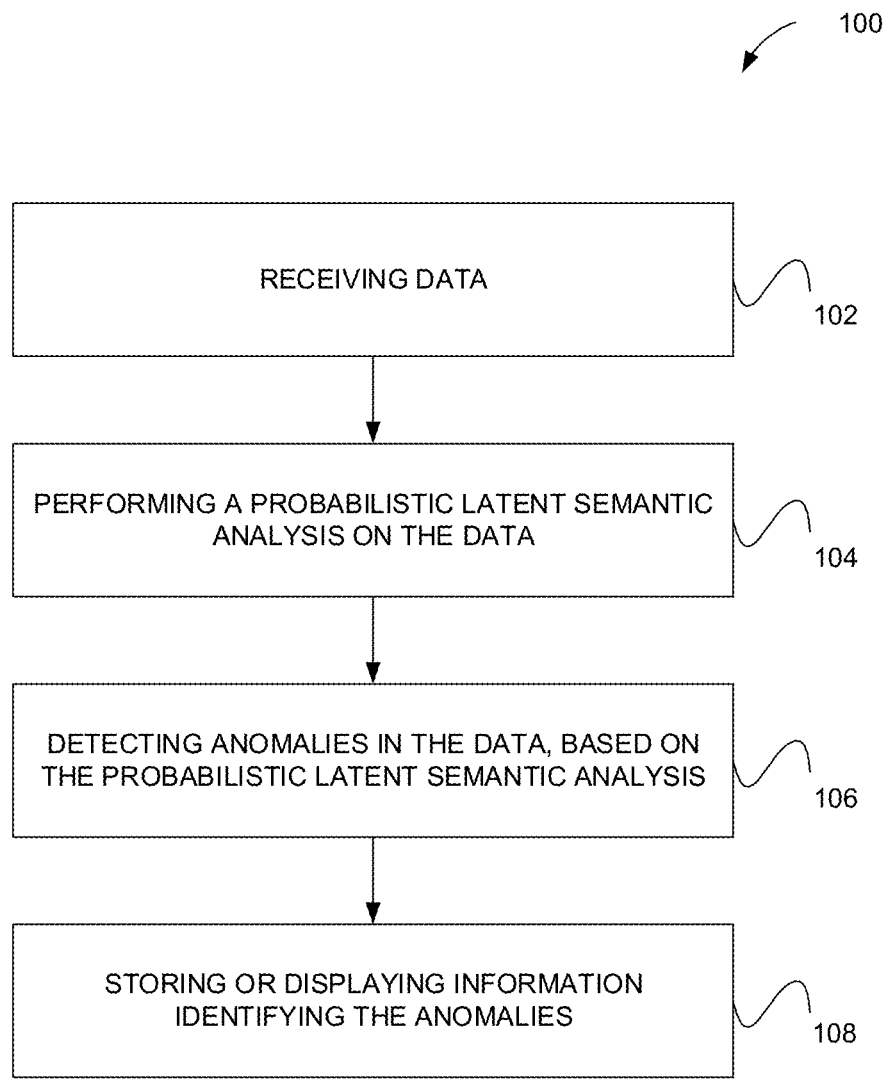
FIG. 1 illustrates a method for anomaly detection using a probabilistic latent semantic analysis (PLSA), in accordance with one embodiment of the present disclosure to detect anomalies within a network.

FIG. 1 illustrates a method 100 for anomaly detection using a PLSA, in accordance with one embodiment of the present disclosure to detect anomalies within a network. As shown in operation 102, data is received. In the context of the present description, such data may be received from any desired environment in which anomaly detection is desired. For example, in various embodiments, the data may be received in connection with a network (e.g. a cellular network, etc.) and, more particularly, in connection with one or more base stations, one or more radio network controllers (RNCs), user devices, etc.

Next, in operation 104, a PLSA is performed, utilizing the data. In the context of the present description, such PLSA refers to probabilistic latent semantic analysis. For example, in one possible embodiment, the PLSA may involve probabilistic latent semantic indexing including a statistical technique for analysis of two-mode and co-occurrence data. In effect, in such PLSA-based embodiment, one may derive a low dimensional representation of observed variables in terms of their affinity to certain hidden variables, and further be based on a mixture decomposition derived from a latent class model.

With continuing reference to FIG. 1, one or more anomalies are detected in the data, based on the PLSA. See operation 106. In the present description, such anomalies include data that is abnormal or does not fit a usual distribution, at least in part.

In operation 108, information on the one or more anomalies is output (e.g. displayed, etc.), stored, and/or otherwise utilized. In the context of the present description, such information may include any information gleaned, derived, or otherwise generated based on the PLSA and/or the data, and is related to the one or more anomalies. Just by way of example, the information may identify the one or more anomalies. Further, in one embodiment, the aforementioned display and/or storage may be effected for the purpose of better understanding and/or improving the environment (e.g. network, etc.) in which the data was collected.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

For example, in one possible embodiment among many, that will be described hereinafter in greater detail, the PLSA may include a Gaussian-based PLSA. Further, as will be described in the context of subsequent embodiments, one or more first variables associated with the data may be mapped to one or more second variables associated with the PLSA. The identification and/or mapping of such first variables may be accomplished manually and/or automatically. Further, the second variables may, in one embodiment, include a cluster variable, a co-occurrence variable, and/or any other variable capable of being associated with the PLSA. Still yet, the first variables may be selected as a function of the environment in which the anomaly detection is desired. For example, in one embodiment involving a cellular network, the first variables may include a time variable, a space variable (e.g. network node variable, etc.), a generating entity variable (e.g., a user equipment, i.e., mobile phone), a key performance indicator (KPI) variable, a key quality indicator (KQI) variable, a location variable, and/or any other variable capable of being associated with a cellular network. By mapping such first variables to the second variables associated with the PLSA, any resulting modeling may be better suited for improved anomaly detection.

Figure 2:
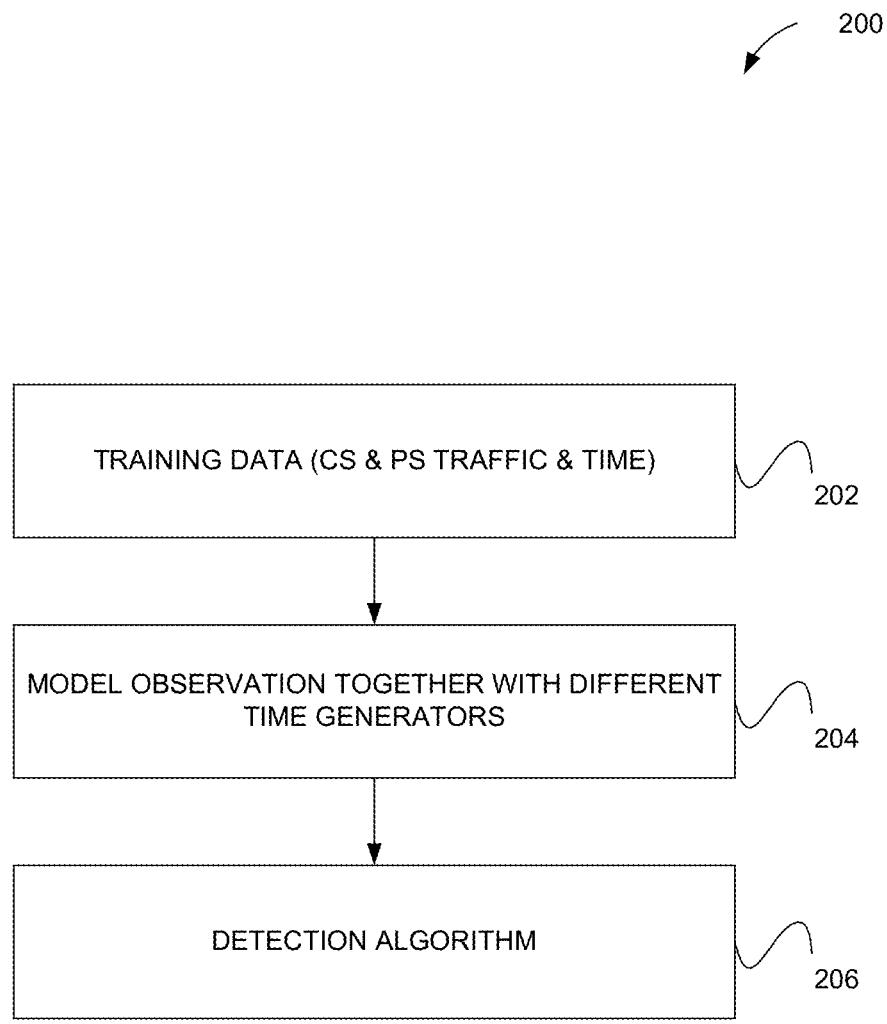
FIG. 2 illustrates a Gaussian probabilistic latent semantic analysis (GPLSA)-based anomaly detection system, in accordance with another embodiment.

FIG. 2 illustrates a Gaussian PLSA (GPLSA)-based anomaly detection system 200, in accordance with another embodiment. As an option, the system 200 may be implemented in the context of any one or more of the embodiments set forth in any previous and/or subsequent figure(s) and/or description thereof. Of course, however, the system 200 may be implemented in the context of any desired environment.

As shown, training data may be received in operation 202. Such training data may include packet service (PS) data and/or circuit service (CS) data (e.g. voice traffic, megabytes, etc.), along with the co-occurrence variable of time associated therewith in a first embodiment. In other embodiments, it is possible to use (in the cellular network context) data variables such as KPIs, KQIs, radio network resources, user equipment location and co-occurrence variables such as network node ID, user equipment ID, etc. For example, the KPIs and KQIs may be used to identify anomalies in terms of performance and quality, respectively. Further, the radio network resources and user equipment location may be used to identify anomalies specific to network resources (e.g. base stations, etc.) and user equipment (e.g. mobile devices, etc.), respectively.

Next, the foregoing data is modeled together with different generating entities (time stamp associated with data in the first embodiment), by taking into account the corresponding (time) variable. See operation 204. To this end, a detection algorithm may be initiated in operation 206, whereby the aforementioned model (that is based on historical data, etc.) may be applied against new data (e.g. training data, actual on-line data, etc.), for anomaly detection in connection with the new data. Of course, other embodiments are contemplated where the above system 200 may use a historical data-based model, to predict future behavior.

Figure 3A:
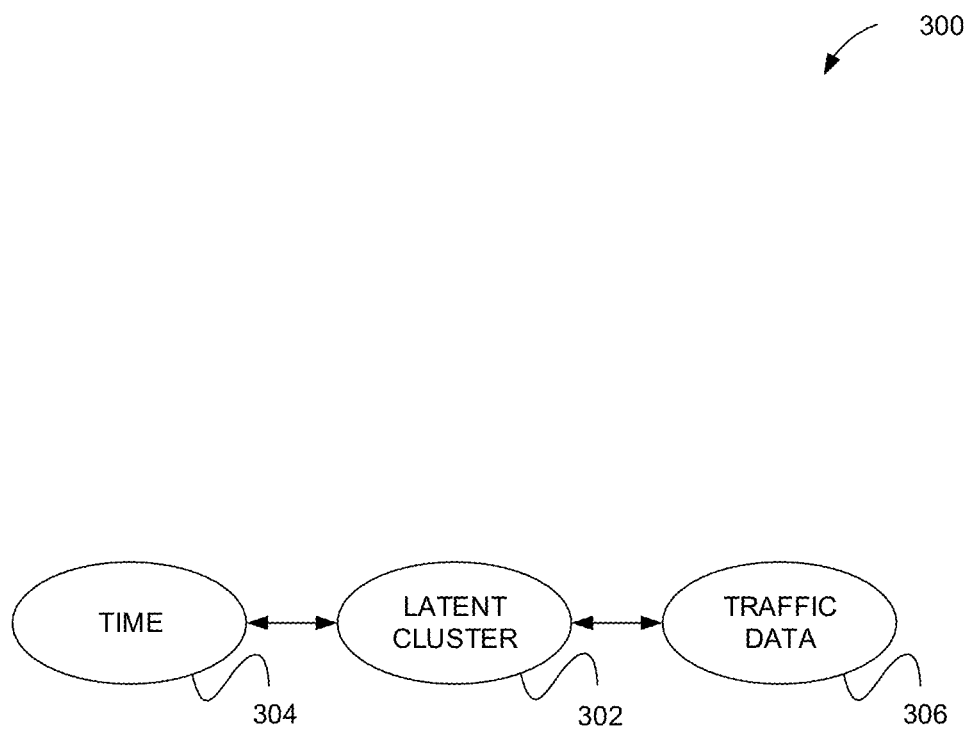
FIG. 3A illustrates a GPLSA-based anomaly detection graph showing an interrelationship among a latent cluster and time/traffic data, in accordance with one embodiment.

FIG. 3A illustrates a GPLSA-based anomaly detection graph 300 showing an interrelationship among a latent cluster and time/traffic data, in accordance with one embodiment. As an option, the graph 300 may be implemented in the context of any one or more of the embodiments set forth in any previous and/or subsequent figure(s) and/or description thereof. Of course, however, the graph 300 may be implemented in the context of any desired environment.

As shown, a latent cluster 302 is conditionally dependent on time 304 and traffic data 306. In use, the time 304 influences the latent cluster 302 which, in turn, influences the traffic data 306. The latent cluster index is not necessarily directly observed in the data and, in this embodiment, reflects the hidden variable of the network usage behavior (e.g., idle, semi-busy, busy etc.) of the underlying collective of subscribers. This is embodied in the exemplary equation below. Specifically, Equation #1 illustrates one possible equation associated with the GPLSA, with the following mapping: z=latent cluster, d=time, and w=traffic data.

$$P(w_i \mid d_j) = \sum_{k=1}^{K} P(z_k \mid d_j) P(w_i \mid z_k) \qquad \text{Equation \#1}$$

Figure 3B:
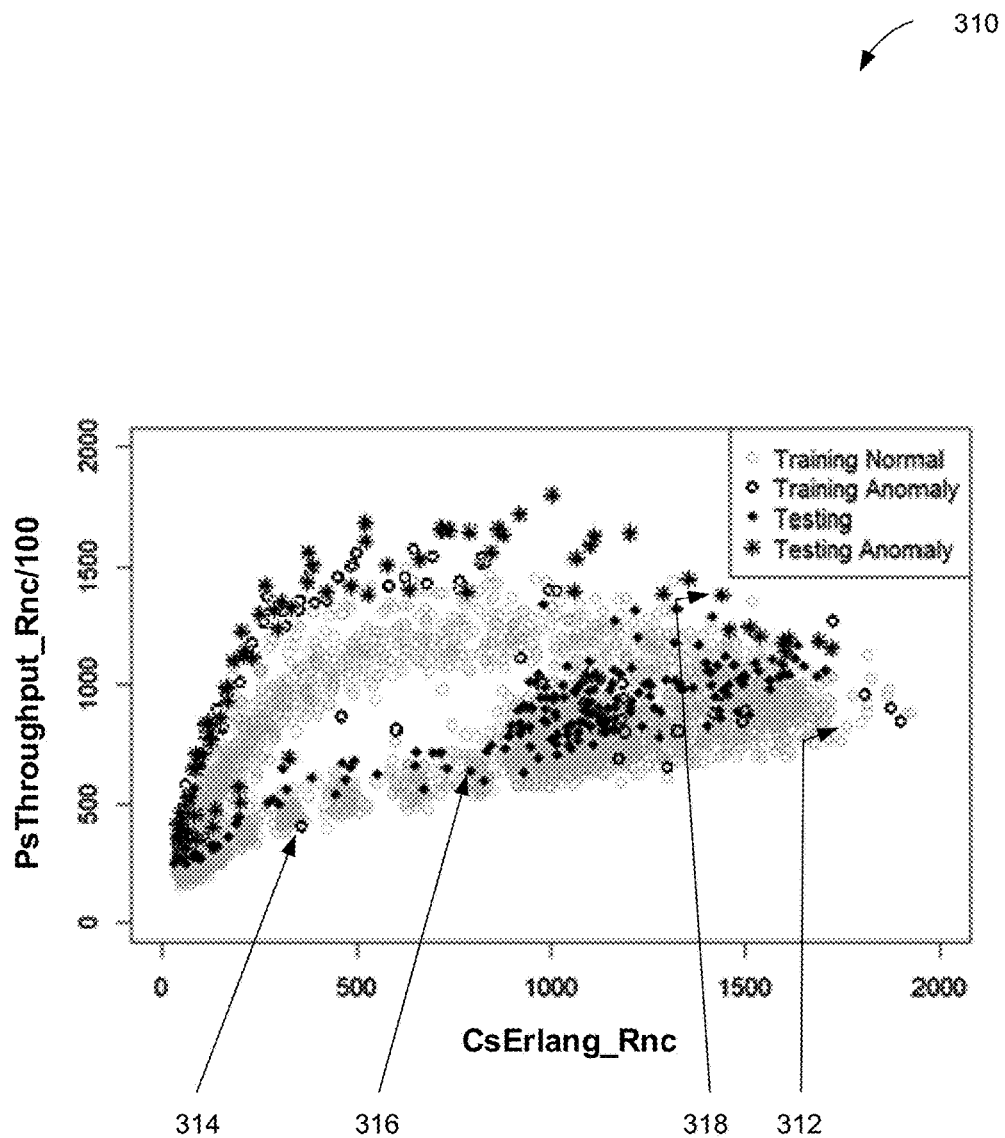
FIG. 3B illustrates an exemplary GPLSA-based anomaly detection data set, in accordance with one embodiment.

FIG. 3B illustrates an exemplary GPLSA-based anomaly detection data set 310, in accordance with one embodiment. As shown, a plurality of normal training data points 312, anomaly training data points 314, normal testing data points 316, anomaly testing data points 318, are shown that result from the application, for example, of the GPLSA-based anomaly detection technique 200 of FIG. 2. As shown, the Y-axis shifts upwards from 312-318. To this end, information on trends, etc. may be identified based on the movement of the anomaly training data points 314 upward, etc.

Figure 4:
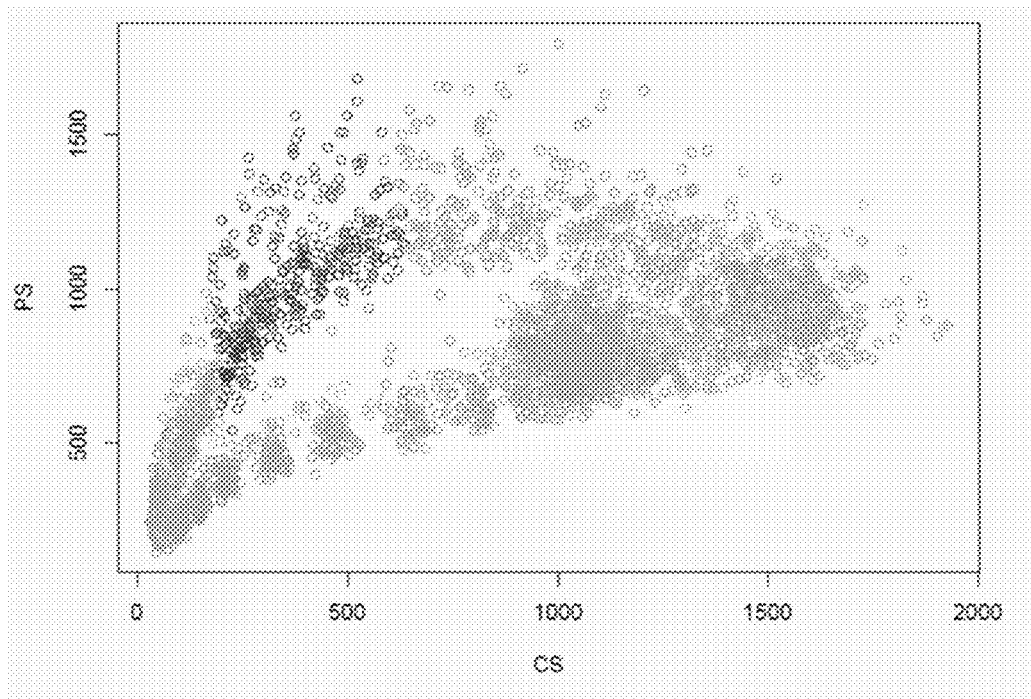
FIG. 4 illustrates GPLSA-based anomaly detection at time 00:30-02:00.
Figure 5:
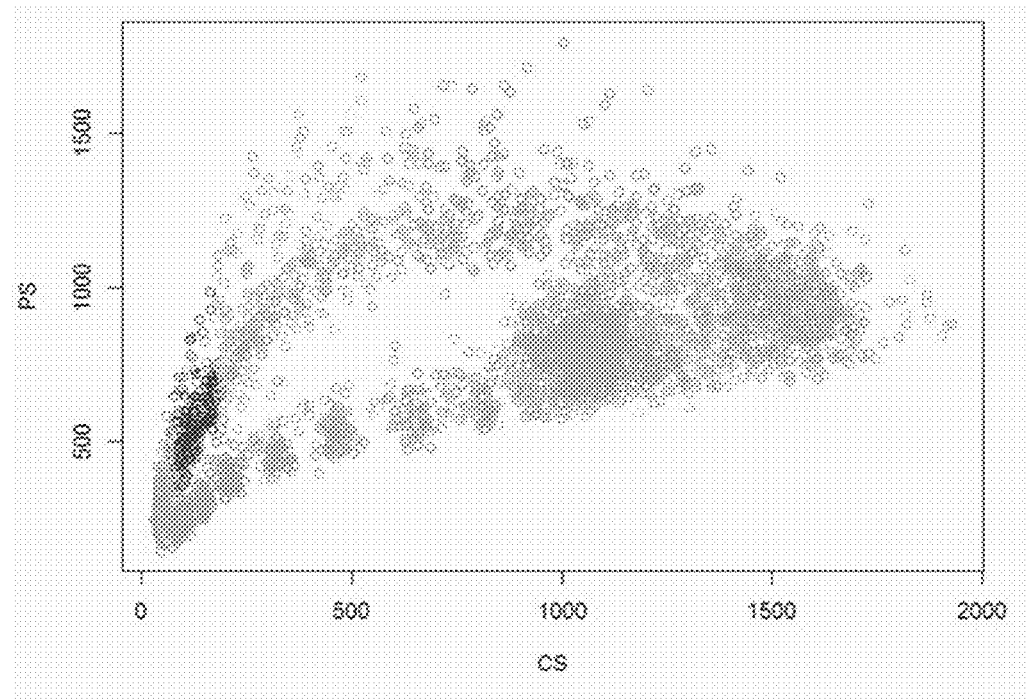
FIG. 5 illustrates GPLSA-based anomaly detection at time 02:30-03:30.
Figure 6:
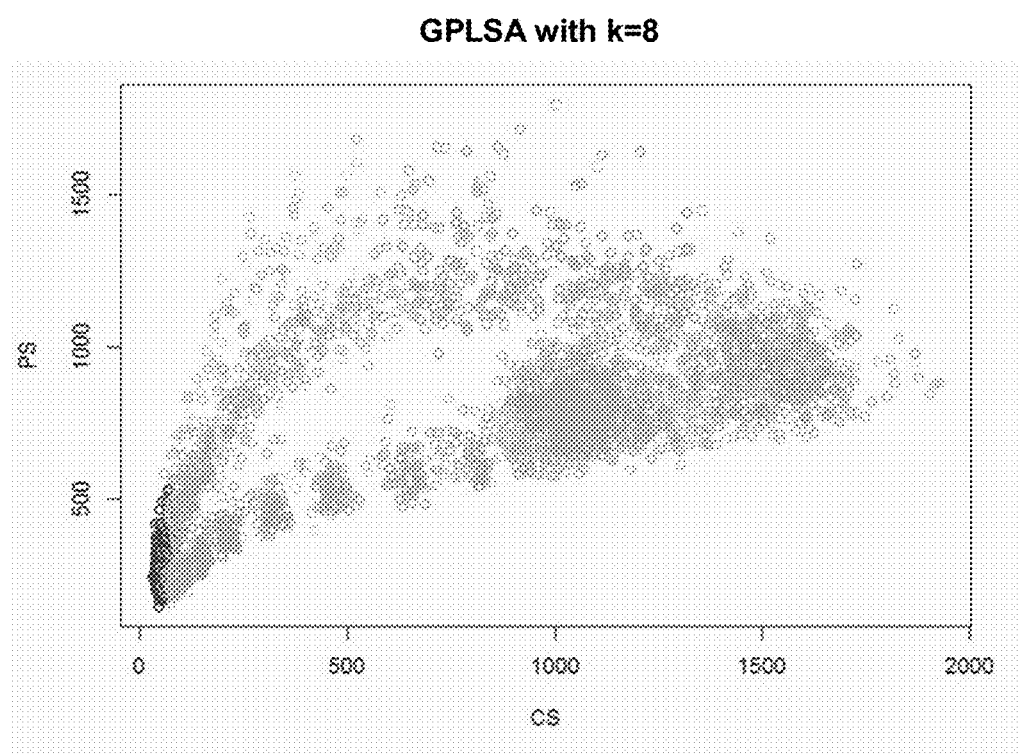
FIG. 6 illustrates GPLSA-based anomaly detection at time 04:00-05:30.
Figure 7:
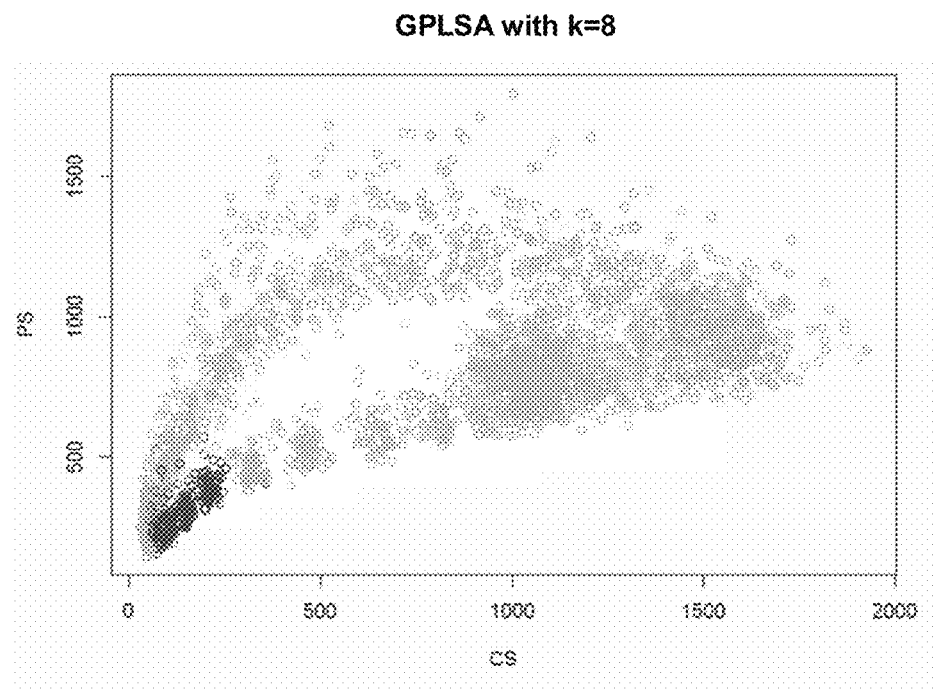
FIG. 7 illustrates GPLSA-based anomaly detection at time 06:00-07:30.
Figure 8:
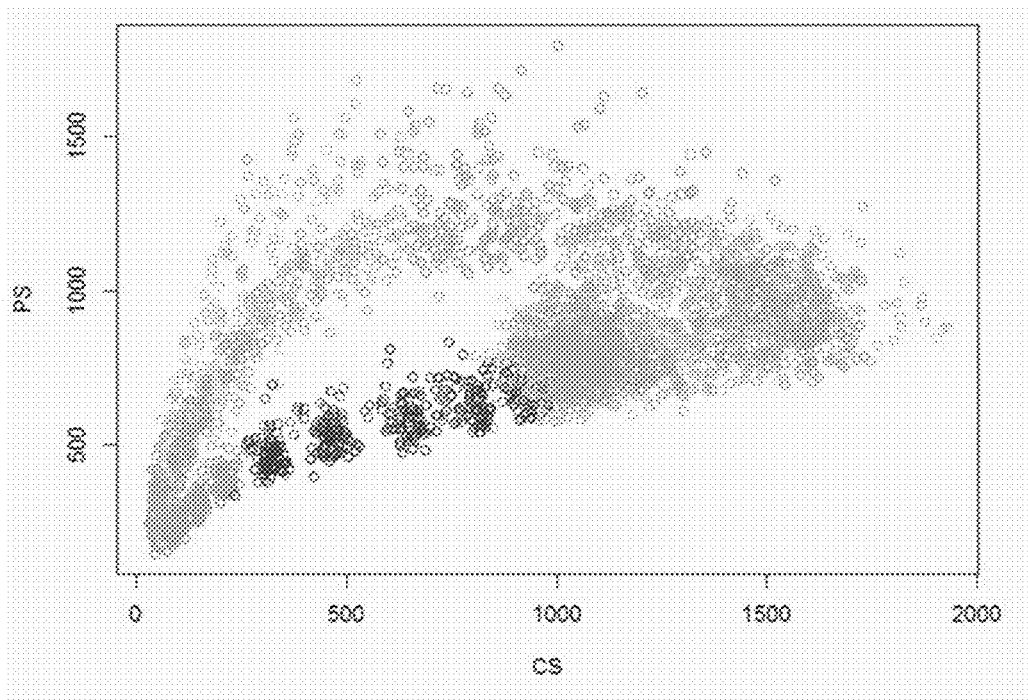
FIG. 8 illustrates GPLSA-based anomaly detection at time 08:00-10:00.
Figure 9:
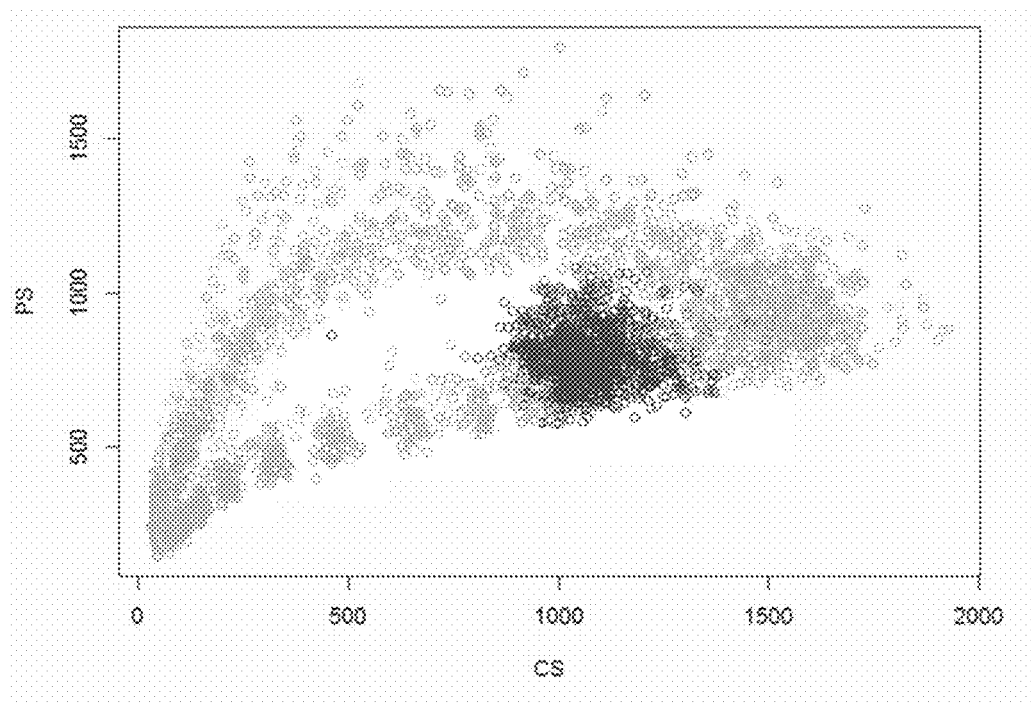
FIG. 9 illustrates GPLSA-based anomaly detection at time 11:00-17:30.
Figure 10:
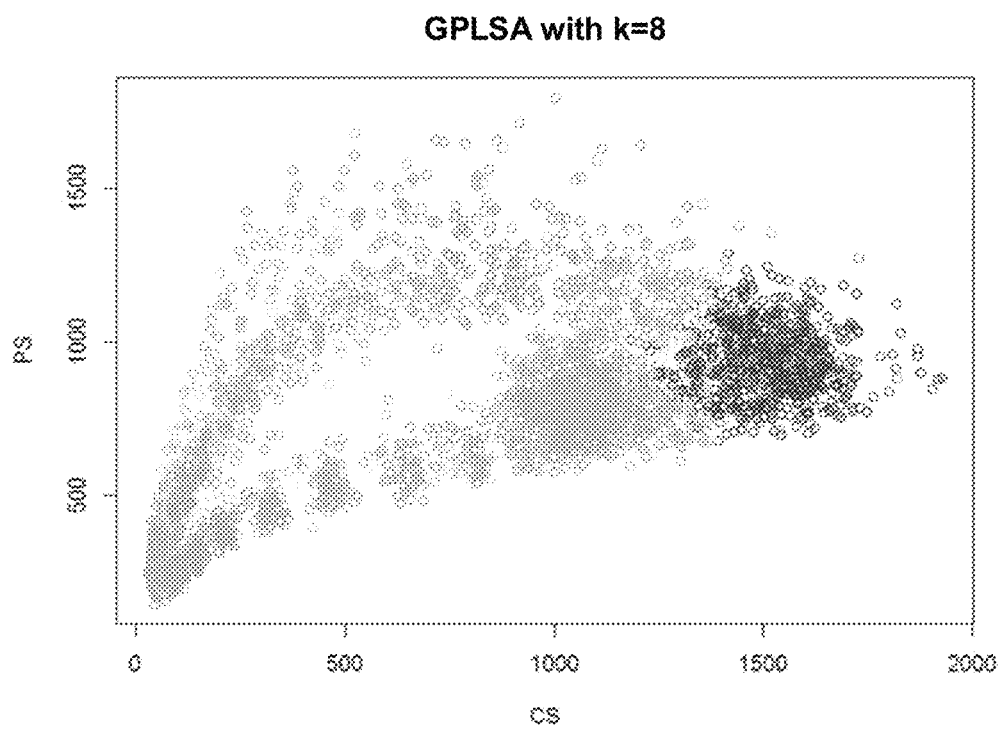
FIG. 10 illustrates GPLSA-based anomaly detection at time 18:00-22:00.
Figure 11:
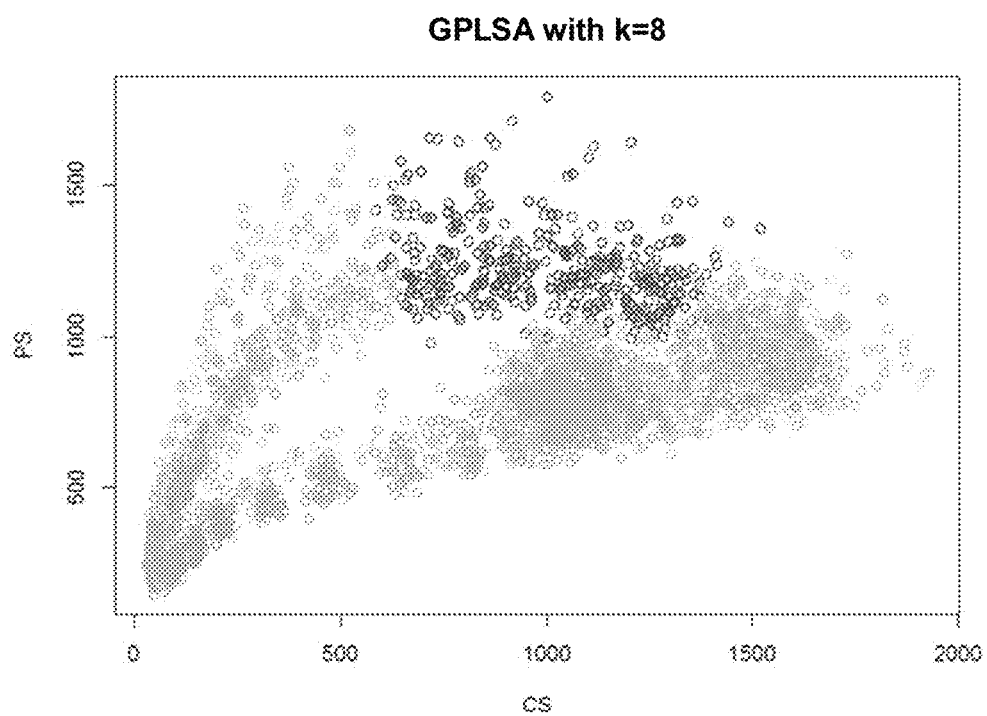
FIG. 11 illustrates GPLSA-based anomaly detection at time 23:00-00:00.

FIGS. 4-11 illustrates an example of GPLSA-based anomaly detection, in accordance with one embodiment that is observed at different times. FIG. 4 illustrates GPLSA-based anomaly detection at time 00:30-02:00. FIG. 5 illustrates GPLSA-based anomaly detection at time 02:30-03:30. FIG. 6 illustrates GPLSA-based anomaly detection at time 04:00-05:30. FIG. 7 illustrates GPLSA-based anomaly detection at time 06:00-07:30. FIG. 8 illustrates GPLSA-based anomaly detection at time 08:00-10:00. FIG. 9 illustrates GPLSA-based anomaly detection at time 11:00-17:30. FIG. 10 illustrates GPLSA-based anomaly detection at time 18:00-22:00. FIG. 11 illustrates GPLSA-based anomaly detection at time 23:00-00:00.

As an option, such example may be implemented in the context of any one or more of the embodiments set forth in any previous and/or subsequent figure(s) and/or description thereof. Of course, however, such example may be implemented in the context of any desired environment.

The GPLSA-based anomaly detection example shown in FIGS. 4-11 is based on both PS and CS parameters, where a PS parameter is represented by the Y-axis and a CS parameter is represented by the X-axis. Specifically, each illustrated data point is the volume of CS erlangs and PS MB processed by a given RNC every half an hour, over 70 days. The high-lighted groups of data are the hidden modes (e.g. clusters, etc.) uncovered by the GPLSA-based anomaly detection.

Table 1 illustrates the specific time associated with each of the graphs shown in FIGS. 4-11, along with a percentage representative of a prior probability of a data point falling in a hidden (e.g. cluster, etc.) mode, given the time of day.

TABLE 1

| FIG. | TIME | PERCENTAGE |
|---|---|---|
| 4 | 00:30-02:00 | 99% |
| 5 | 02:30-03:30 | 99% |
| 6 | 04:00-05:30 | 99% |
| 7 | 06:00-07:30 | 99% |
| 8 | 08:00-10:00 | 99% |
| 9 | 11:00-17:30 | 99% |
| 10 | 18:00-22:00 | 99% |
| 11 | 23:00-00:00 | 99% |

As demonstrated, the GPLSA-based anomaly detection is, in some embodiments, more accurate in evaluating the likelihood of an arbitrary data point generated at some time of day. This is because additional insight may be achieved by virtue of the time-dependent variations in the modeling. Just by way of example, a distribution at one time (i.e. one of the FIGS. 4-11) may be different than at another time (i.e. another one of the FIGS. 4-11). Thus, given a particular data point, a determination as to whether it is an anomaly or not can more effectively be performed, by taking into account the time, etc. For instance, a data point may be an anomaly at a certain time (based on a particular distribution), but may not necessary be an anomaly at another time.

Figure 12:
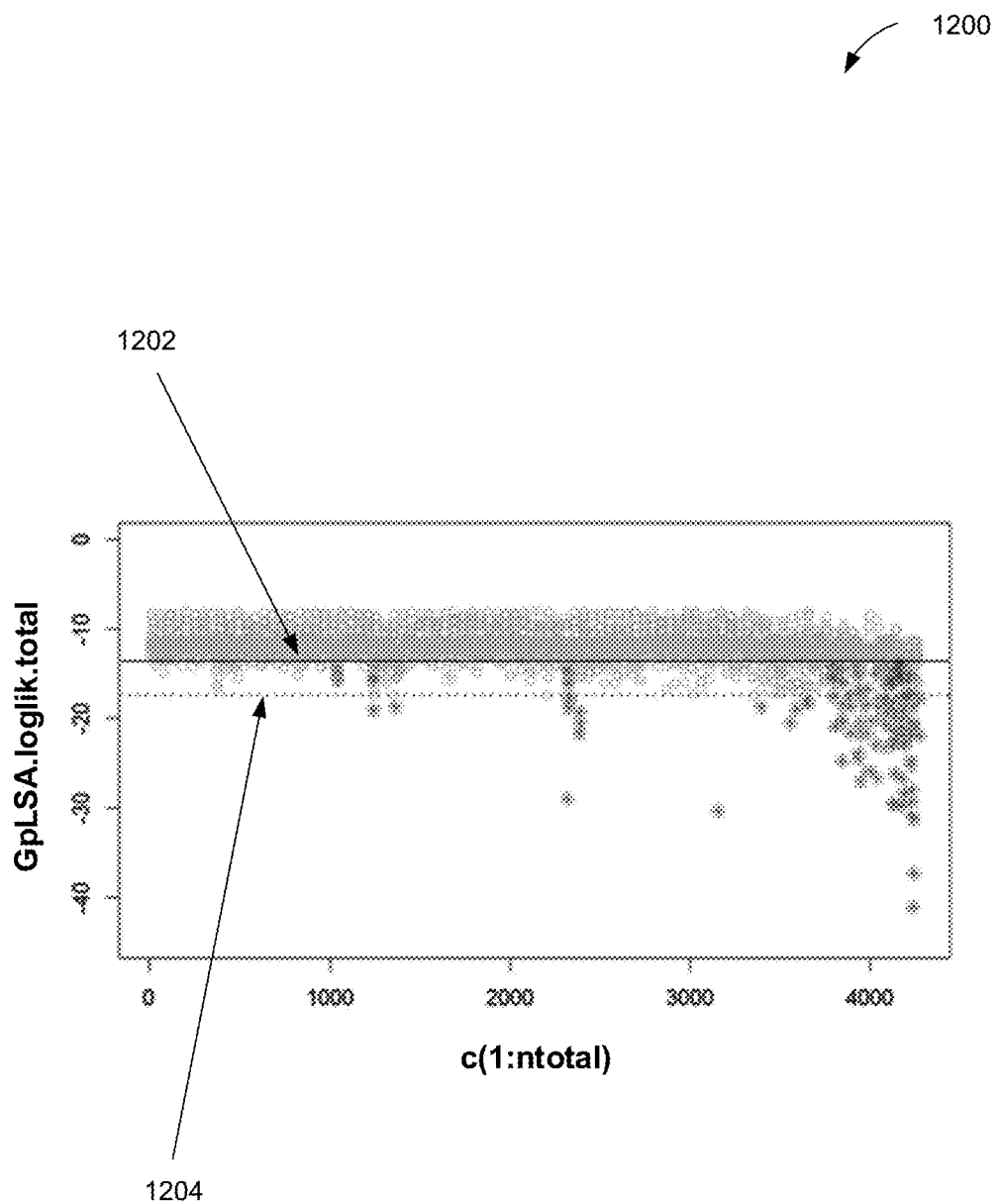
FIG. 12 illustrates a graphical representation of a GPLSA-based anomaly detection technique using thresholds, in accordance with one embodiment.

FIG. 12 illustrates a graphical representation of a GPLSA-based anomaly detection technique 1200 using thresholds, in accordance with one embodiment. As an option, the technique 1200 may be implemented in the context of any one or more of the embodiments set forth in any previous and/or subsequent figure(s) and/or description thereof. Of course, however, the technique 1200 may be implemented in the context of any desired environment.

As shown, one or more thresholds 1202, 1204 may be set, in the manner shown. To this end, any data points that reside above or below such thresholds 1202, 1204 may be definitively determined to be an anomaly or not. For example, the circles above the threshold 1202 may be definitively determined to not be an anomaly. Further, the stars (e.g. "*," etc.) below the threshold 1204 may be definitively determined to be an anomaly. Still yet, any data points that reside within such thresholds 1202, 1204 may be identified as potential anomalies. Further, to confirm whether the one or more potential anomalies are actual anomalies, a time in which the one or more potential anomalies (e.g. the data points that reside within such thresholds 1202, 1204 over time, etc.) persists may be determined. To this end, the one or more potential anomalies may be confirmed to be anomalies, based the time in which the one or more potential anomalies persists. With reference to FIG. 12, the stars within the thresholds 1202, 1204 are those that meet the time window requirement, and thus constitute actual anomalies.

In various embodiments, the threshold(s) may be reset and/or adjusted by a sensitivity and accuracy requirement. In the context of the example shown in FIG. 12, these are set at the 0.10 percentile (see threshold 1202) and 0.01 percentile (see threshold 1204). Further, an anomaly may be confirmed if it persists over a delay window with length w=6. Of course, other percentiles and/or delay windows may be utilized in other embodiments.

Thus, the GPLSA-based anomaly detection of the various embodiments described herein may more accurately consider time and/or space (e.g. node identifier, etc.) or, more generally, a data generating entity (e.g., a mobile user equipment ID) with more sensitivity (i.e. earlier detection) and relatively lower complexity, with respect to systems that perform anomaly detection without PLSA. In one embodiment, the GPLSA-based anomaly detection may incorporate a Bayesian framework based upon a GMM which identifies hidden semantic associations for co-occurrence data and adopts it in anomaly detection. This may be accomplished by mapping traffic, KPI metrics, time, etc. variables to a latent cluster (e.g. hidden variable) variable (Z). For example, the mapping of CS/PS, time to latent cluster Z, may be reflected as $Z(X, G) \rightarrow Z$. Specifically, X may refer to observations in one data set (e.g. traffic data, etc.), while G may refer to another data set (e.g. time-stamp, node ID, etc.). To this end, a latent variable model may be provided for general co-occurrence data, which associates the hidden variable (Z) with mixture decomposition for each observation X, taking into consideration prior preference of the co-occurring data G to specific values of Z.

In use, the GPLSA-based anomaly detection may be applied to model time/space indexed series of data for detecting anomalies therein. Further, it may be applied to explicitly take into account a relationship between the generating entity (e.g. time, space ID such as network node ID, user equipment ID, etc.) with the hidden variables that give structure to (or embed patterns within) the data. This is accomplished by recognizing the generating entity to be a time-stamp, network node ID, or user equipment ID in a wireless/cellular system. Still yet, the data may be recognized to be a vector (or scalar) of traffic, resources, KPIs, KQIs, user locations or some combination of these, that arise in a cellular/wireless network comprising base stations, RNCs, etc.

In one possible additional embodiment, a set of data may be collected from one or more user devices [e.g. mobile terminal, user equipment (UE), etc.] regarding its location (e.g. x, y coordinates, etc.) or indirectly about its location (e.g. a vector of signal strengths of surrounding base stations transmitted in measurement reports by the UE, etc.). To this end, such data (received from multiple user devices) may be clustered in a geographic region or market to find patterns of traffic and anomalies in these patterns. For example, such anomalies may be used to identify an unlikely location visited (or signal strength vector).

In addition to the above data, a user device identifier (e.g. UE ID, subscriber or session ID, etc.) may be used as a co-occurrence variable which may be a space variable and time of day (e.g. time variable, etc.). To this end, a GPLSA-based anomaly detection algorithm may be employed to more finely detect anomalies. For example, it may be determined that "it is unlikely that Subscriber S at time of day T will be at location (x,y) based on his/her prior historical patterns together with everyone's historical patterns", as opposed to simply that "a given location is unlikely based on everyone's historical patterns" or, in another extreme (that builds a model per space and/or time variable with less data and hence more errors), "it is unlikely that Subscriber S at time of day T will be at location (x,y) based on only his/her prior historical patterns."

Thus, just as a network node identifier may serve as a co-occurrence variable, a user device identifier may also be one. Further, just as KPI or KQI may be the main data variable in the previous embodiments, a location (or associated vector of signal strengths) may be the main data variable in the present embodiment.

To this end, in some embodiments, given a time or space indexed series of data vectors with a generating entity (e.g. underlying time and date stamps and/or spatial network node ID, etc.), anomalies may be detected with an acceptably low probability of missed detection and false alarms accounting for the characteristics of the time-of-day and the individual network node. In an era of explosive data traffic growth and the up-and-coming "Internet of Things", a "big data" analytics solution such as that described herein (in the context of some embodiments) may provide a lot of value to operators to manage their networks. Specifically, up-and-coming generations of cellular networks will be larger scale and self-organizing, and optimized anomaly detection may play an important role in such context.

Figure 13:
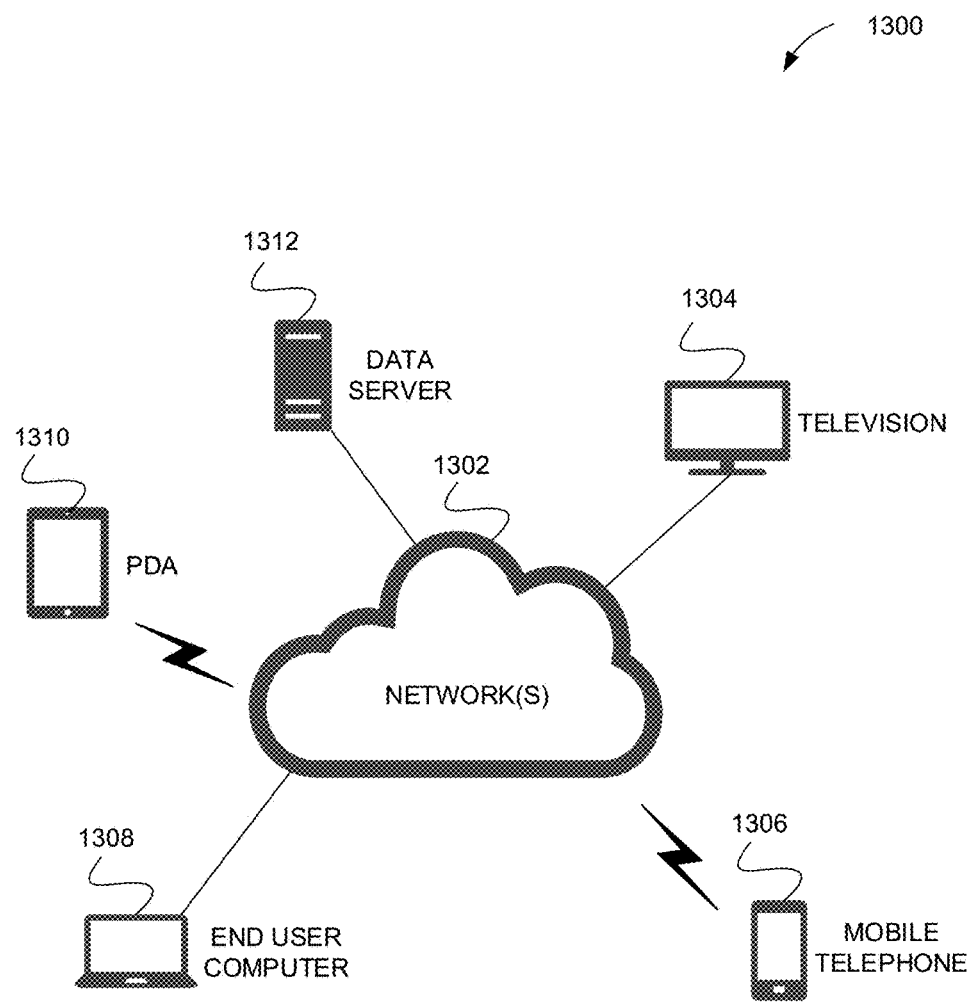
FIG. 13 illustrates a network architecture, in accordance with one possible embodiment.

FIG. 13 illustrates a network architecture 1300, in accordance with one possible embodiment. As shown, at least one network 1302 is provided. In the context of the present network architecture 1300, the network 1302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1302 may be provided.

Coupled to the network 1302 is a plurality of devices. For example, a server computer 1312 and an end user computer 1308 may be coupled to the network 1302 for communication purposes. Such end user computer 1308 may include a desktop computer, lap-top computer, and/or any other type of logic. Still yet, various other devices may be coupled to the network 1302 including a personal digital assistant (PDA) device 1310, a mobile phone device 1306, a television 1304, etc.

Figure 14:
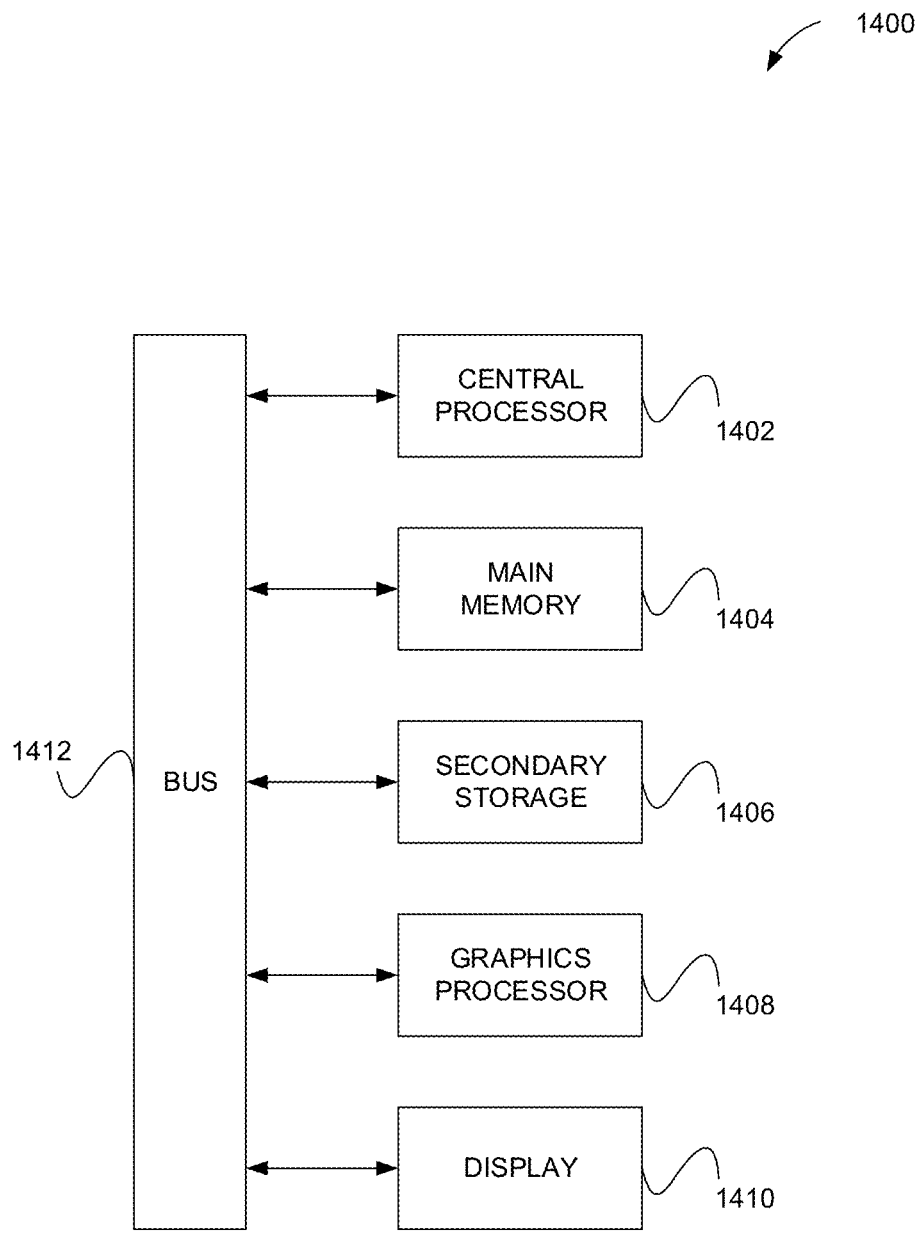
FIG. 14 illustrates an exemplary system, in accordance with one embodiment.

FIG. 14 illustrates an exemplary system 1400, in accordance with one embodiment. As an option, the system 1400 may be implemented in the context of any of the devices of the network architecture 1300 of FIG. 13. Of course, the system 1400 may be implemented in any desired environment.

As shown, a system 1400 is provided including at least one central processor 1402 which is connected to a communication bus 1412. The system 1400 also includes main memory 1404 [e.g. random access memory (RAM), etc.]. The system 1400 also includes a graphics processor 1408 and a display 1410.

The system 1400 may also include a secondary storage 1406. The secondary storage 1406 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1404, the secondary storage 1406, and/or any other memory, for that matter. Such computer programs, when executed, enable the system 1400 to perform various functions (as set forth above, for example). Memory 1404, storage 1406 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising:
    code for receiving first measurement data of a plurality of variables, the first measurement data being obtained based on data samples that are collected in a wireless network during a first period of time, and the data samples comprising traffic data communicated in the wireless network or network performance data of the wireless network, wherein the wireless network comprises a plurality of communication nodes;
    code for performing a probabilistic latent semantic analysis on the first measurement data utilizing at least one processor to cluster the data samples into different clusters based on the first measurement data of the plurality of variables, each of the different clusters being associated with a time stamp or a communication node;
    code for receiving second measurement data of the plurality of variables, the second measurement data being obtained from one or more data samples that are collected during a second period of time, wherein each of the second measurement data of the plurality of variables is associated with a corresponding time stamp or a corresponding communication node;
    code for detecting whether there is an anomaly in the one or more data samples based on the second measurement data, the different clusters, and time stamps or communication nodes associated with the different clusters;
    code for displaying information on the anomaly; and
    code for identifying an anomaly of the wireless network with respect to the plurality of variables based on the anomaly detected in the one or more data samples.

2. The computer program product of claim 1, wherein the computer program product is configured such that the probabilistic latent semantic analysis includes a Gaussian probabilistic latent semantic analysis.

3. The computer program product of claim 1, wherein the computer program product is configured such that the data samples are received in connection with at least one of a cellular network, one or more base stations, or one or more user devices.

4. The computer program product of claim 1, wherein the computer program product is configured such that the data samples are received in connection with one or more radio network controllers.

5. The computer program product of claim 1, wherein the computer program product is configured such that one or more first variables associated with the data samples are mapped to one or more second variables associated with the probabilistic latent semantic analysis.

6. The computer program product of claim 5, wherein the computer program product is configured such that the one or more first variables include a time variable.

7. The computer program product of claim 5, wherein the computer program product is configured such that the one or more first variables include a space variable.

8. The computer program product of claim 5, wherein the computer program product is configured such that the one or more first variables include a network node or user equipment variable.

9. The computer program product of claim 5, wherein the computer program product is configured such that the one or more first variables include a key performance indicator variable.

10. The computer program product of claim 5, wherein the computer program product is configured such that the one or more first variables include a key quality indicator variable.

11. The computer program product of claim 5, wherein the computer program product is configured such that the one or more first variables include a network resource variable.

12. The computer program product of claim 5, wherein the computer program product is configured such that the one or more first variables include a network traffic variable.

13. The computer program product of claim 5, wherein the computer program product is configured such that the one or more first variables include a location variable.

14. The computer program product of claim 5, wherein the computer program product is configured such that the one or more second variables include co-occurrence variables.

15. The computer program product of claim 5, wherein the computer program product is configured such that the one or more second variables include a cluster variable.

16. The computer program product of claim 1, and further comprising: code for setting one or more thresholds.

17. The computer program product of claim 16, and further comprising: code for identifying potential anomalies based on the one or more thresholds.

18. The computer program product of claim 16, and further comprising: code for confirming one or more potential anomalies to be anomalies based a time in which the one or more potential anomalies persists.

19. A method, comprising:
receiving first measurement data of a plurality of variables, the first measurement data being obtained based on data samples that are collected in a wireless network during a first period of time, and the data samples comprising traffic data communicated in the wireless network or network performance data of the wireless network, wherein the wireless network comprises a plurality of communication nodes;
performing a probabilistic latent semantic analysis on the first measurement data, utilizing at least one processor to cluster the data samples into different clusters based on the first measurement data of the plurality of variables, each of the different clusters being associated with a time stamp or a communication node;
receiving second measurement data of the plurality of variables, the second measurement data being obtained from one or more data samples that are collected during a second period of time, wherein each of the second measurement data of the plurality of variables is associated with a corresponding time stamp or a corresponding communication node;
detecting whether there is an anomaly in the one or more data samples based on the second measurement data, the different clusters, and time stamps or communication nodes associated with the different clusters, utilizing the at least one processor;
identifying a performance anomaly of the wireless network with respect to the plurality of variables based on the anomaly detected in the one or more data samples; and
storing information identifying the anomaly, utilizing memory in communication with the at least one processor.

20. An apparatus, comprising:
a non-transitory memory storage comprising instructions; and
one or more processors in communication with the memory storage, wherein the one or more processors execute the instructions to:
receive first measurement data of a plurality of variables, the first measurement data being obtained based on data samples that are collected in a wireless network during a first period of time, and the data samples comprising traffic data communicated in the wireless network or network performance data of the wireless network, wherein the wireless network comprises a plurality of communication nodes;
perform probabilistic latent semantic analysis on the first measurement data to cluster the data samples into different clusters based on the first measurement data of the plurality of variables, each of the different clusters being associated with a time stamp or a communication node;
receive second measurement data of the plurality of variables, the second measurement data being obtained from one or more data samples that are collected during a second period of time, wherein each of the second measurement data of the plurality of variables is associated with a corresponding time stamp or a corresponding communication node;
detect whether there is an anomaly in the one or more data samples based on the second measurement data, the different clusters, and time stamps or communication nodes associated with the different clusters;
cause output of information identifying the anomaly; and
identify an anomaly of the wireless network with respect to the plurality of variables based on the anomaly detected in the one or more data samples.

* * * * *